United States Patent
Tune et al.

(10) Patent No.: US 10,303,624 B2
(45) Date of Patent: May 28, 2019

(54) ARBITRATING AND MULTIPLEXING CIRCUITRY

(71) Applicant: ARM LIMITED, Cambridge (GB)

(72) Inventors: Andrew David Tune, Sheffield (GB); Peter Andrew Riocreux, Sheffield (GB); Alessandro Grande, Sheffield (GB)

(73) Assignee: ARM Limited, Cambridge (GB)

( * ) Notice: Subject to any disclaimer, the term of this patent is extended or adjusted under 35 U.S.C. 154(b) by 224 days.

(21) Appl. No.: 15/273,932

(22) Filed: Sep. 23, 2016

(65) Prior Publication Data

US 2017/0012901 A1    Jan. 12, 2017

Related U.S. Application Data

(63) Continuation-in-part of application No. 14/734,367, filed on Jun. 9, 2015, now Pat. No. 9,906,440.

(30) Foreign Application Priority Data

Jul. 8, 2014    (GB) .................................. 1412140.4

(51) Int. Cl.
*H04L 12/937*    (2013.01)
*G06F 13/14*    (2006.01)

(52) U.S. Cl.
CPC .................... *G06F 13/14* (2013.01)

(58) Field of Classification Search
CPC .............................. H04L 49/254; H04L 45/48
See application file for complete search history.

(56) References Cited

U.S. PATENT DOCUMENTS

| | | | |
|---|---|---|---|
| 5,832,278 A | 11/1998 | Pham | |
| 7,447,817 B1 * | 11/2008 | Sripada | G06F 13/362 710/113 |
| 9,117,022 B1 * | 8/2015 | Chiu | G06F 13/364 |

OTHER PUBLICATIONS

Search Report for GB1412140.4 dated Jan. 12, 2015, three pages.
(Continued)

*Primary Examiner* — Jamal Javaid
(74) *Attorney, Agent, or Firm* — Nixon & Vanderhye P.C.

(57) ABSTRACT

Arbitrating and multiplexing circuitry for performing an arbitration between a plurality of inputs and a selection of at least one of said plurality of inputs to provide an output comprises arbitrating tree circuitry having X arbitrating levels, where X is an integer greater than one; and multiplexing tree circuitry having Y multiplexing levels, where Y is an integer greater than one; wherein (i) said Y multiplexing levels comprise a first set of said multiplexing levels upstream of a second set of said multiplexing levels; (ii) said first set of said multiplexing levels is configured to operate in parallel with at least some of said X arbitrating levels, whereby said first set of multiplexing levels is configured to perform a partial selection in parallel with said arbitration performed by said X arbitrating levels; and (iii) said second set of said multiplexing levels is configured to operate in series with said X arbitrating levels, whereby said second set of multiplexing levels completes said selection to provide said output following completion of and in dependence upon said arbitration.

21 Claims, 12 Drawing Sheets

(56) References Cited

OTHER PUBLICATIONS

G. Dimitrakopoulos, Dynamic-Priority Arbiter and Multiplexer Soft Macros for On-Chip Network Switches, *EDAA*, Mar. 12, 2012, four pages.
G. Dimitrakopoulos et al., "Scalable arbiters and multiplexers for on-FGPA interconnection networks", Sep. 5, 2011, seven pages.
D. Harris, "A Taxonomy of Parallel Prefix Networks", *Signals, Systems and Computers Conference*, vol. 2, Nov. 9-12, 2003, pp. 2213-2217.
P. Kogge and H. Stone, "A Parallel Algorithm for the Efficient Solution of a General Class of Recurrence Equations", *IEEE Transactions on Computers*, vol. C-22, No. 8, Aug. 1973, pp. 786-793.
Office Action dated May 30, 2017 in co-pending U.S. Appl. No. 14/734,367, 15 pages.
U.S. Appl. No. 14/734,367, filed Jun. 9, 2015, Inventor: Raman et al.
G. Dimitrakopoulos et al, "Fast Arbiters for On-Chip Network Switches" *International Conference on Computer Design*, Oct. 12, 2008, pp. 664-670.

\* cited by examiner

ARBITRATING AND MULTIPLEXING CIRCUITRY

This application is a continuation-in-part of U.S. application Ser. No. 14/734,367 filed Jun. 9, 2015 which claims priority to GB Patent Application No. 1412140.4 filed Jul. 8, 2014, the entire contents of each of which are hereby incorporated by reference.

BACKGROUND

Field

This disclosure relates to the field of data processing systems. More particularly, this disclosure relates to arbitrating and multiplexing circuitry for performing an arbitration between a plurality of inputs and a selection of at least one of the plurality of inputs to provide an output.

Description

It is known to provide arbitrating and multiplexing circuitry. One known form of arbitrating and multiplexing circuitry is as illustrated in FIG. 1 of the accompanying drawings. In this example, an arbiter 2 is disposed in series with a multiplexer 4. The arbiter 2 receives a plurality of requests indicating which inputs are carrying data between which an arbitration is required. The arbiter 2 performs an arbitration in accordance with whatever arbitration algorithm is being employed, and generates a grant signal to select one of the inputs. The grant signal is supplied to the multiplexer 4 and controls the multiplexer 4 to select the appropriate input to serve as the output from the multiplexer 4. The processing delay associated with the action of the circuitry of FIG. 1 is at least the time taken for the arbiter 2 to perform the arbitration operation summed with the time taken for the multiplexer 4 to perform the selection operation in response to the grant signal generated by the arbiter 2 after it has finished its arbitration.

The time taken for the serially performed arbitration and multiplexing operations of the circuitry of FIG. 1 may be a limitation in system performance, e.g. may limit clock frequency and/or require the operation to be spread over multiple clock cycles in a manner which increases latency, etc.

SUMMARY

At least some example embodiments of the disclosure provide arbitrating and multiplexing circuitry for performing an arbitration between a plurality of inputs and a selection of at least one of said plurality of inputs to provide an output, said arbitrating and multiplexing circuitry comprising:

arbitrating tree circuitry having X arbitrating levels, where X is an integer greater than one; and multiplexing tree circuitry having Y multiplexing levels, where Y is an integer greater than one; wherein (i) said Y multiplexing levels comprise a first set of said multiplexing levels upstream of a second set of said multiplexing levels;

(ii) said first set of said multiplexing levels is configured to operate in parallel with at least some of said X arbitrating levels, whereby said first set of multiplexing levels is configured to perform a partial selection in parallel with said arbitration performed by said X arbitrating levels; and (iii) said second set of said multiplexing levels is configured to operate in series with said X arbitrating levels, whereby said second set of multiplexing levels completes said selection to provide said output following completion of and in dependence upon said arbitration.

At least some further example embodiments of the disclosure provide arbitrating and multiplexing circuitry for performing an arbitration between a plurality of inputs and a selection of at least one of said plurality of inputs to provide an output, said arbitrating and multiplexing circuitry comprising:

arbitrating tree means for performing said arbitration, said arbitrating tree means having X arbitrating levels, where X is an integer greater than one; and multiplexing tree means for performing said selection, said multiplexing tree means having Y multiplexing levels, where Y is an integer greater than one; wherein (i) said Y multiplexing levels comprise a first set of said multiplexing levels upstream of a second set of said multiplexing levels;

(ii) said first set of said multiplexing levels is configured to operate in parallel with at least some of said X arbitrating levels, whereby said first set of multiplexing levels is configured to perform a partial selection in parallel with said arbitration performed by said X arbitrating levels; and (iii) said second set of said multiplexing levels is configured to operate in series with said X arbitrating levels, whereby said second set of multiplexing levels completes said selection to provide said output following completion of and in dependence upon said arbitration.

At least some further example embodiments of the disclosure provide a method of arbitrating and multiplexing to perform an arbitration between a plurality of inputs and a selection of at least one of said plurality of inputs to provide an output, said method comprising the steps of:

performing said arbitration with arbitration tree circuitry, said arbitrating tree circuitry having X arbitrating levels, where X is an integer greater than one; and performing said selection with multiplexing tree circuitry, said multiplexing tree circuitry having Y multiplexing levels, where Y is an integer greater than one; wherein (i) said Y multiplexing levels comprise a first set of said multiplexing levels upstream of a second set of said multiplexing levels;

(ii) said first set of said multiplexing levels operates in parallel with at least some of said X arbitrating levels, whereby said first set of multiplexing levels performs a partial selection in parallel with said arbitration performed by said X arbitrating levels; and (iii) said second set of said multiplexing levels operates in series with said X arbitrating levels, whereby said second set of multiplexing levels completes said selection to provide said output following completion of and in dependence upon said arbitration.

At least further example embodiments provide arbitrating circuitry for performing an arbitration between a plurality of inputs and a selection of at least one of said plurality of inputs, said arbitrating circuitry comprising:

an array of interconnected arbiter devices, the array of arbiter devices operating with respect to a set of Q inputs;

in which the array of arbiter devices comprises M sub-levels, at least a first sub-level having T arbiter devices each operating with respect to U inputs, where $Q=U^M$ and $Q=TU$.

in which, for each sub-level other than a first sub-level, each arbiter device in a sub-level is configured to receive as input requests signals indicating an arbitration outcome for two or more arbiter devices in a preceding sub-level, and to arbitrate between those input requests.

The above, and other objects, features and advantages of this disclosure will be apparent from the following detailed description of illustrative embodiments which is to be read in connection with the accompanying drawings.

DRAWINGS

FIG. 1 schematically illustrates an arbiter in series with a multiplexer;

FIG. 2 schematically illustrates the logic depth of multiplexers of different widths;

FIG. 3 schematically illustrates a first example embodiment of arbitrating and multiplexing circuitry;

FIG. 4 schematically illustrates a second example embodiment of arbitrating and multiplexing circuitry;

FIG. 5 schematically illustrates a third example embodiment of arbitrating and multiplexing circuitry;

Figure 8:
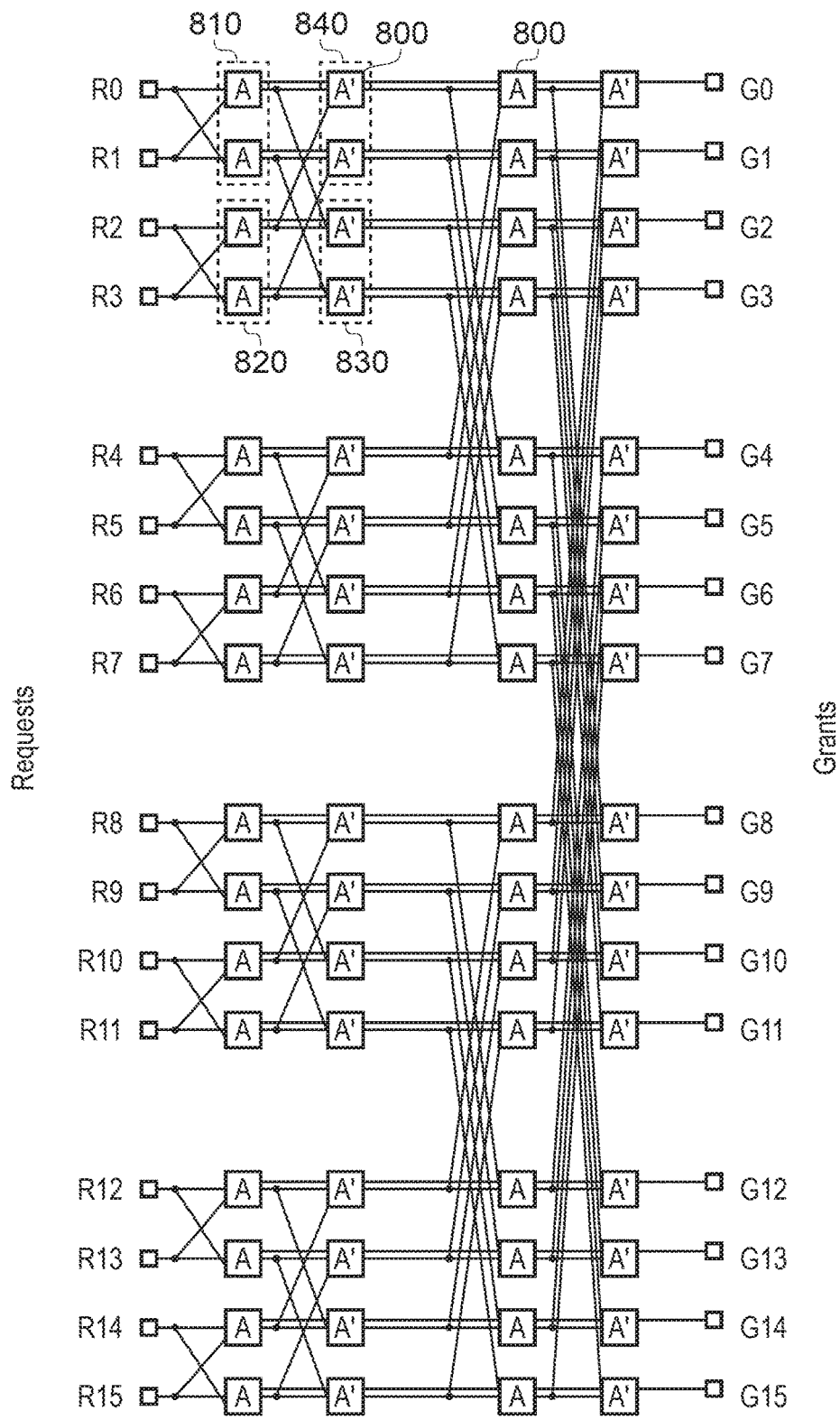
Figure 10:
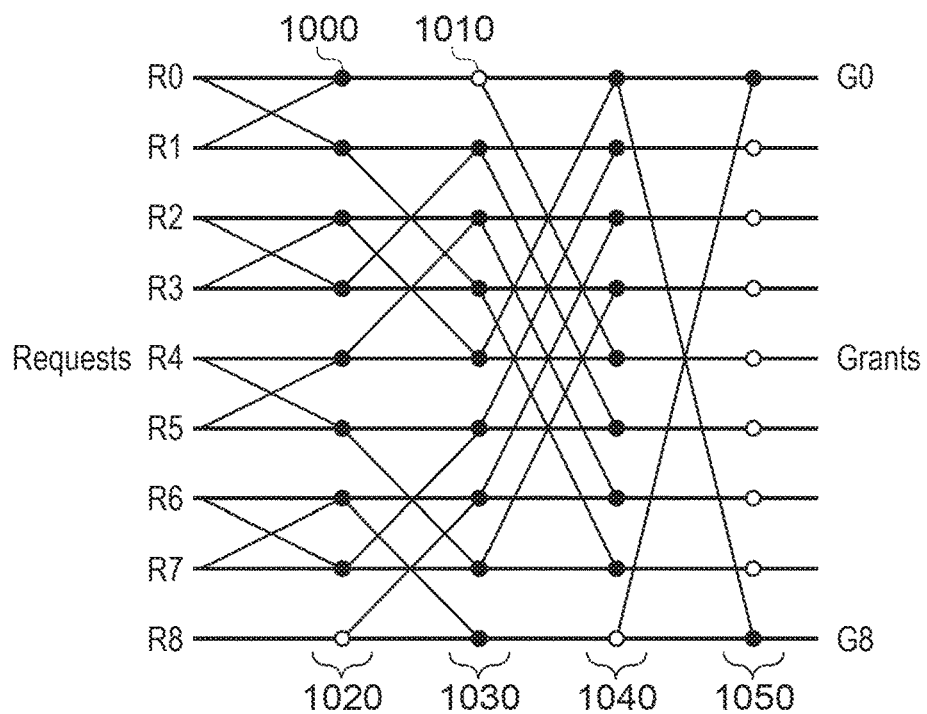
Figure 9:
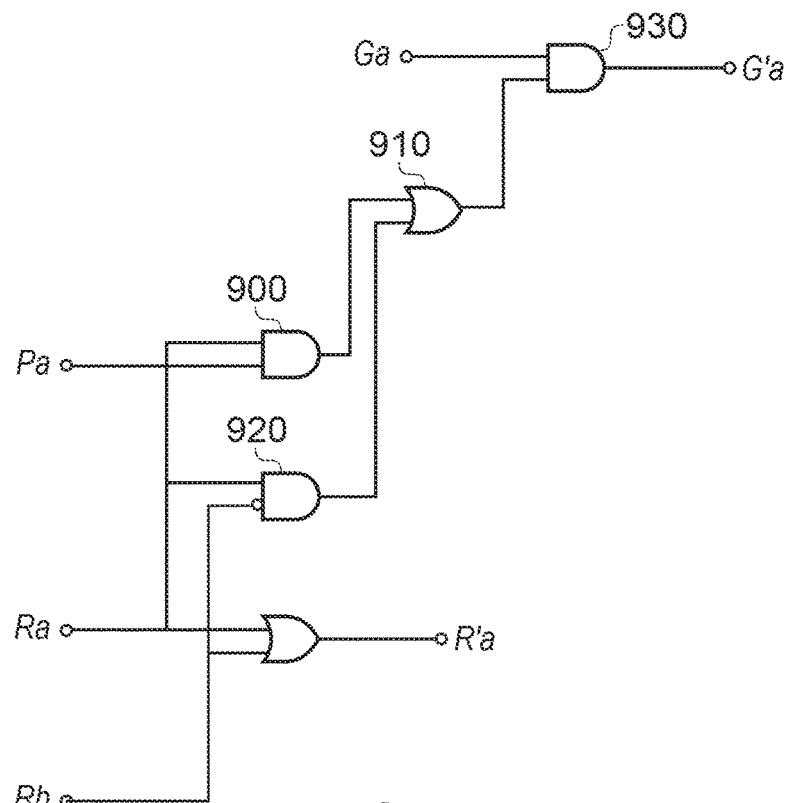
Figure 11:
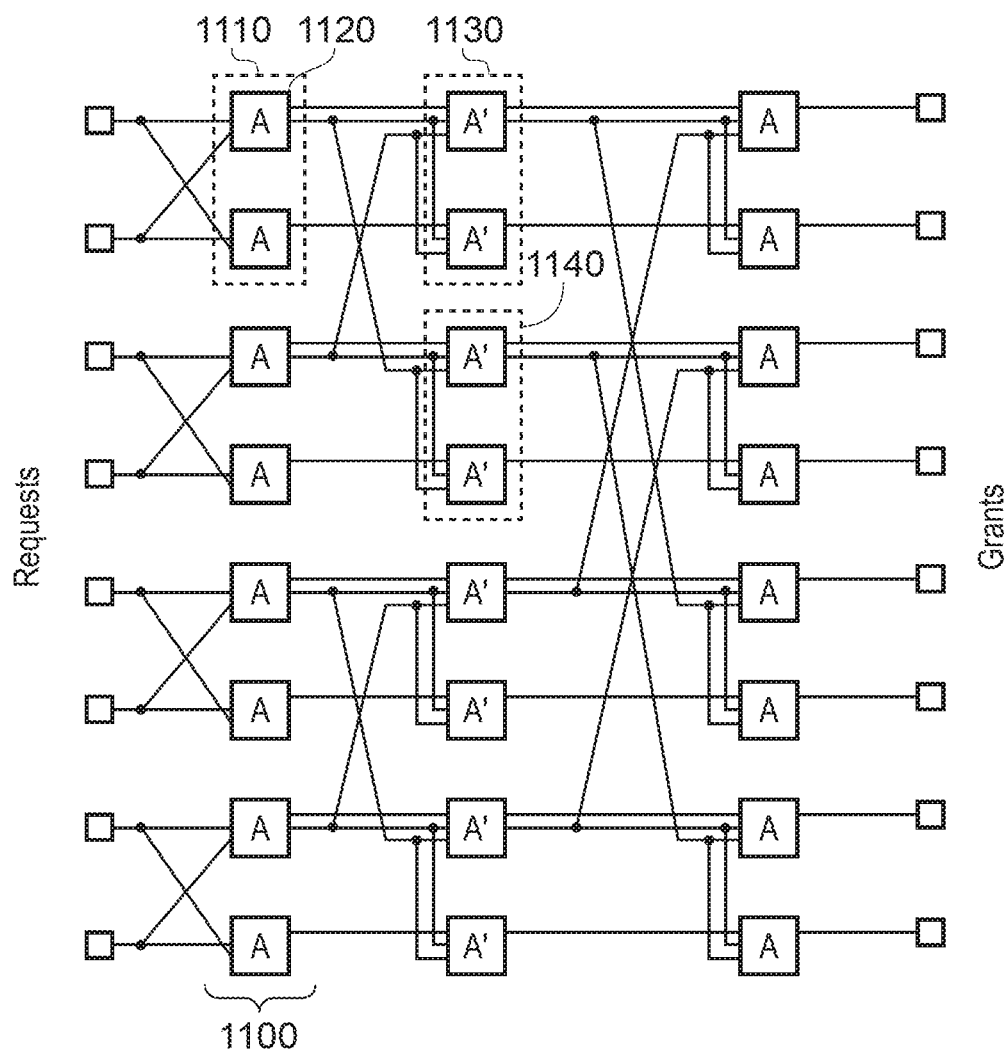
Figure 12:
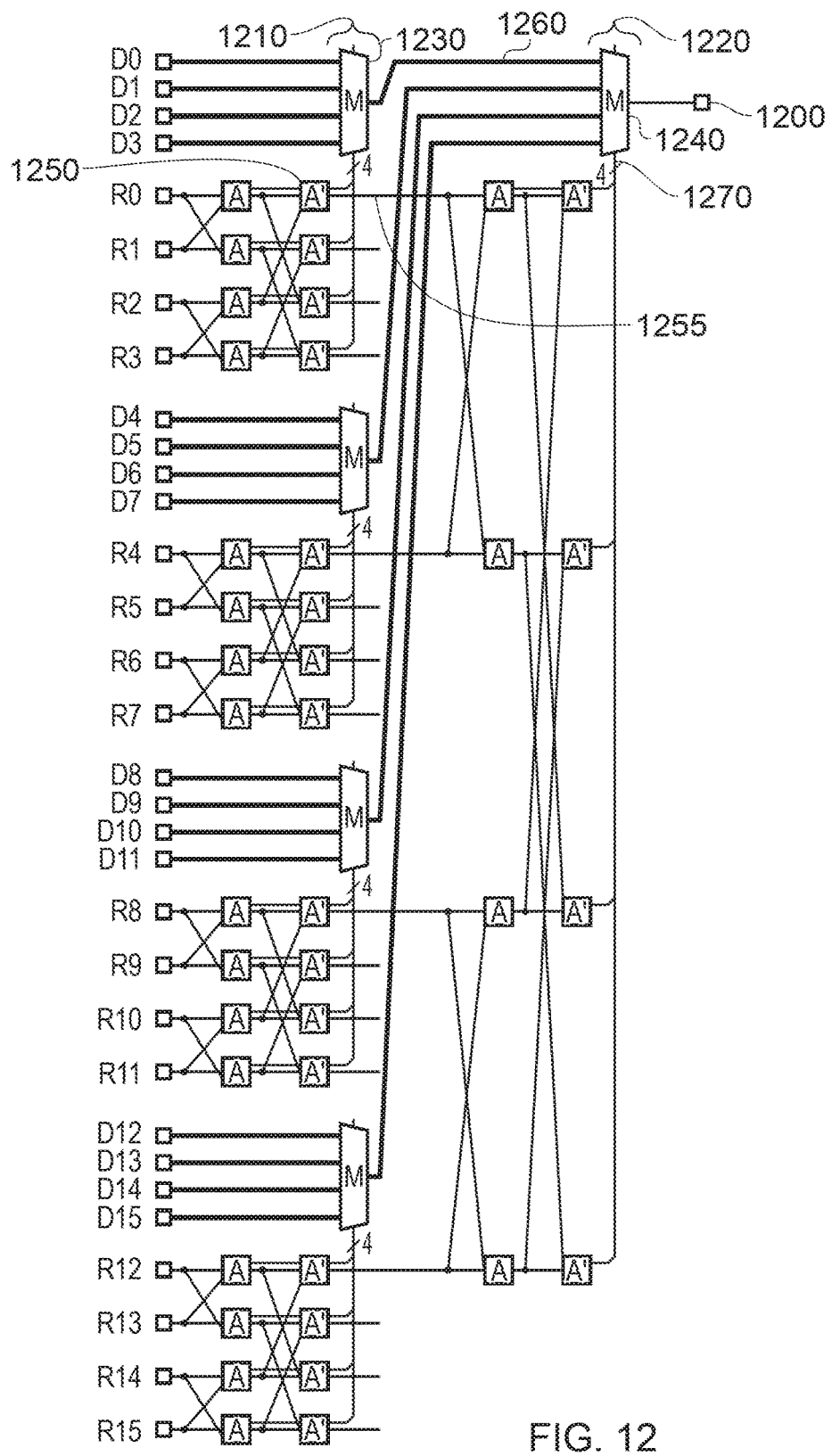

FIG. 8 schematically illustrates arbitrating circuitry;

FIG. 9 schematically illustrates an arbiter circuit;

FIG. 10 schematically illustrates arbitrating circuitry;

FIG. 11 schematically illustrates arbitrating circuitry with so-called sparse connections;

FIG. 12 schematically illustrates arbitrating and multiplexing circuitry; and

Figure 13:
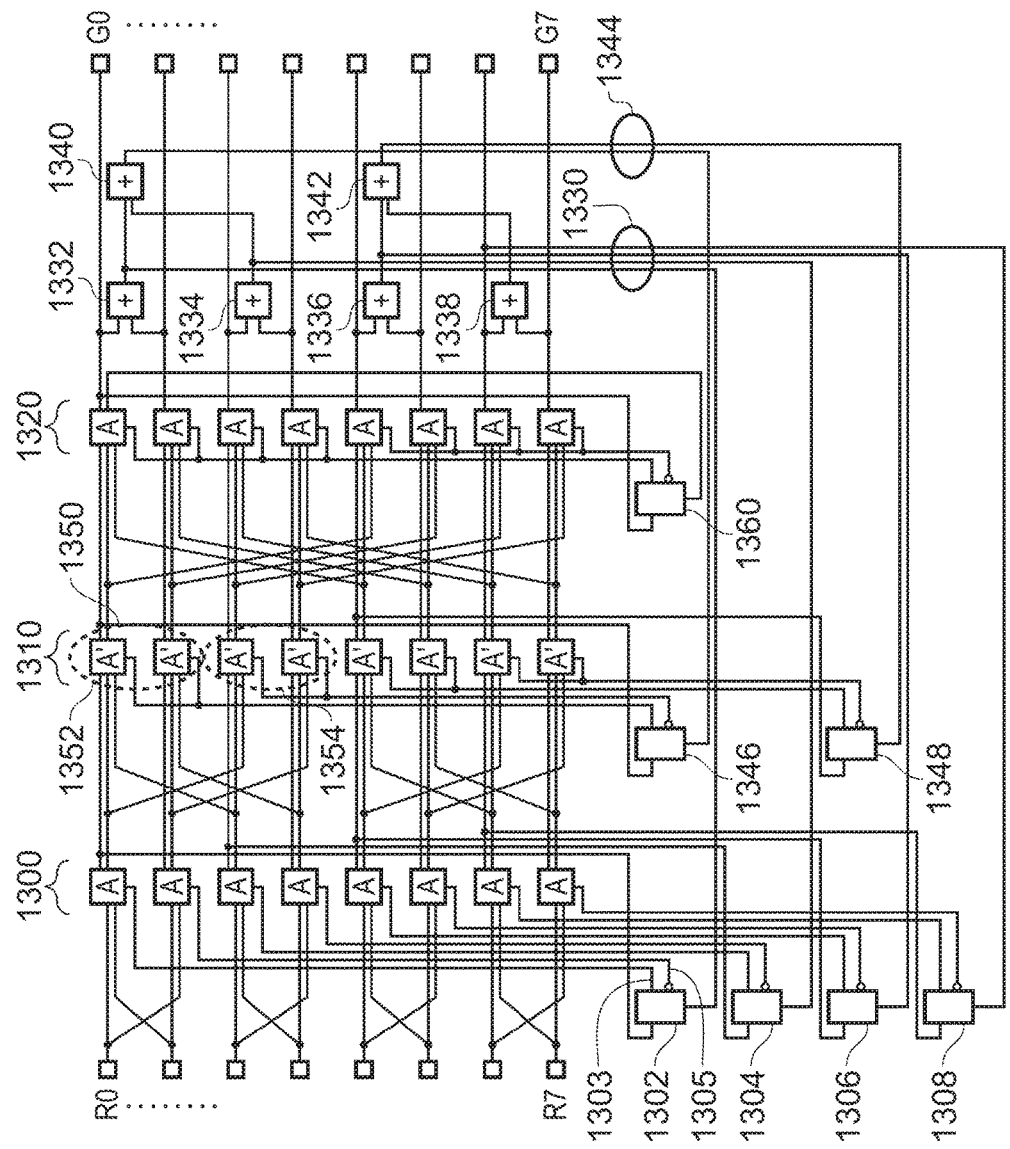

FIG. 13 schematically illustrates arbitrating circuitry with priority data stores.

EMBODIMENTS

The present technique recognises that the arbitrating and multiplexing circuitry can be made faster and more efficient by partially operating the multiplexing tree in parallel with the arbitrating tree. This can reduce the width of the final multiplexing required once the arbitration has been completed, with the first stages of the multiplexing operation being "hidden" from a timing perspective in parallel with the arbitrating tree. The use of the present technique will tend to make the gate depth of the multiplexing tree as a whole greater in a manner which would normally be considered to prejudice the worker in this field against such an approach, but the present technique recognises that enough of this deeper multiplexing tree may be hidden in parallel with the operation of the arbitrating tree that an overall increase in speed and efficiency may be gained.

In some example embodiments, Y is less than X indicating that the multiplexing tree has fewer levels than the arbitrating tree. More specifically, in some example embodiments the first set of multiplexing levels contains a number of levels that is the smallest integer greater than or equal to X/2. The final multiplexing performed after the arbitration has completed may be performed in a single multiplexer level and it has been found that in practice the multiplexing levels performed in parallel with the arbitration tree are balanced with each other in time when there are substantially half the number of multiplexing levels within the first set of multiplexing levels which are performed in parallel with the arbitrating tree performing its arbitration.

In some embodiments the single multiplexing level which forms the second set of multiplexing levels may comprise a final multiplexer switched by a final switching signal generated upon completion of the arbitration. This final switching signal may not represent directly the arbitration result generated, but it does require the full arbitration to have been completed in order that the final switching signal has a defined value which may be used to control the final multiplexer.

The final multiplexer may be a P-way multiplexer. This P-way multiplexer may be wider than the multiplexers employed within the first set of multiplexing levels which are operating in parallel with the arbitration tree circuitry. The multiplexers which operate in a parallel with the arbitration tree circuitry (i.e. within the first set of multiplexing levels) may be Q-way multiplexers. Some efficient embodiments employ 4-way multiplexers as these are suited to the characteristics of the transistors which are typically used to implement such multiplexers.

The Q-way multiplexers within the multiplexing levels of the first set may be switched by respective and intermediate switching signals generated prior to the completion of the arbitration. The arbitrating levels within the arbitrating tree circuitry may generate these intermediate switching signals when the arbitration is partially performed and accordingly allow the selection to be partially performed prior to the end of the arbitration, and the final determination of the actual individual or group of inputs that need to be selected.

In some embodiments, the X arbitrating levels may comprise a plurality of Q-way arbiters. Matching the width of the arbiters to the width of the multiplexers within the portions of the arbitrating tree circuitry and the multiplexing tree circuitry which operate in parallel simplifies the generation of the intermediate switching signals and allows the Q-way arbiters to control a respective Q-way multiplexer in a direct and efficient manner.

The width of the various multiplexers and arbiters could vary. Some efficient example implementations use widths which are a power of two and in particular use a width of four as previously mentioned.

If a value of R is $\log_2$ of the width of the arbiters and multiplexers operating in parallel, then in some efficient embodiments, the Q-way multiplexers have a logic depth corresponding to one AND gate and R OR gates.

While wider multiplexers are generally more efficient in terms of the logic depth they consume relative to the degree (radix) of multiplexing they perform, the present technique recognises that narrower, and consequently less efficient multiplexers, may be hidden in parallel with the operation of the arbitrating tree circuitry while the final multiplexer may be made wider and more efficient. In particular, the final P-way multiplexer may have a logic depth corresponding to one AND gate and S OR gates were S is the smallest integer value that is equal to or greater than $\log_2(P)$.

In some example embodiments, the arbitrating and multiplexing circuitry may be arranged such that each of the plurality of inputs has a corresponding active signal indicating that it is active and should be subject to arbitration. Within this context, the arbitrating tree circuitry may be arranged such that it fully performs the arbitration in direct dependence upon the plurality of active signals. Accordingly, the active signals presented to the arbitrating and multiplexing circuitry do not require any pre-processing or other manipulation in order that the operation of the arbitrating and multiplexing circuitry may commence. This reduces the latency of the arbitrating and multiplexing circuitry.

It will be appreciated that the arbitration performed may be based upon a variety of different algorithms. For example, the arbitration may be performed based on a pseudo least recently used algorithm, a least recently used algorithm, a fair arbitration algorithm (e.g. such as is described in published patent application US-A-2013/0318270, the content of which is incorporated herein in by reference (e.g. the description of a weakly fair arbitration algorithm and it implementation)) or a random algorithm. The arbitrating tree circuitry may be configured to also generate an arbitration result signal upon completion of the arbitration. This arbitration result signal may indicate which of the plurality of inputs was selected to provide the output. Such an arbitration result signal may, for example, be used to acknowledge to the source of the input signals that they have been selected and accordingly may be de-asserted.

In examples, each of said Q-way arbiters comprises an array of interconnected arbiter devices, the array of arbiter devices operating with respect to a respective set of Q inputs. The array of arbiter devices comprises M sub-levels, at least a first sub-level having T arbiter devices each operating with respect to U inputs, where $Q=U^M$ and $Q=TU$.

In some examples, each sub-level has T arbiter devices. For example, for each sub-level other than a first sub-level, each arbiter device in a sub-level is configured to receive as input requests signals indicating an arbitration outcome for two or more arbiter devices in a preceding sub-level, and to arbitrate between those input requests. This allows a structure which provides multi-way arbitration with potentially reduced fan-out (or in other words, a reduced need for any individual logic stage to drive a next logic stage) compared to other arrangements.

Each arbiter device may be configured to detect whether to select a given input in response to a request for selection of that input and requests for selection of the others of the inputs handled by that arbiter device. One technique for arbitration is a so-called least-recently-used or pseudo-least-recently-used arbitration in which each arbiter device is responsive to state data indicating a more-recently granted input, to select another of the inputs handled by that arbiter device in response to a conflict of requests with the more recently granted input. The circuitry may comprise logic to update the state data for use by an arbiter device in response to a request on one of the inputs handled by that arbiter device being granted by the arbitrating and multiplexing circuitry.

In examples, each arbiter device comprises two or more instances of arbitration logic, each instance being configured to detect whether a request at a corresponding input should be granted.

The arbitrating and multiplexing circuitry may comprise a final arbitration level having an array of interconnected arbiter devices configured to arbitrate between arbitration outputs of the plurality of Q-way arbiters.

In some instances the total number of inputs N is not equal to an integer power of U. in some examples, this can be handled by the N inputs being distributed across arbiter devices and pass-through devices so that for each sub-level, at least one pass-through device is provided. To provide potentially more fair arbitration, in examples a grouping of inputs amongst the arbiter devices and pass-through devices differs between at least two of the sub-levels.

Figure 2:
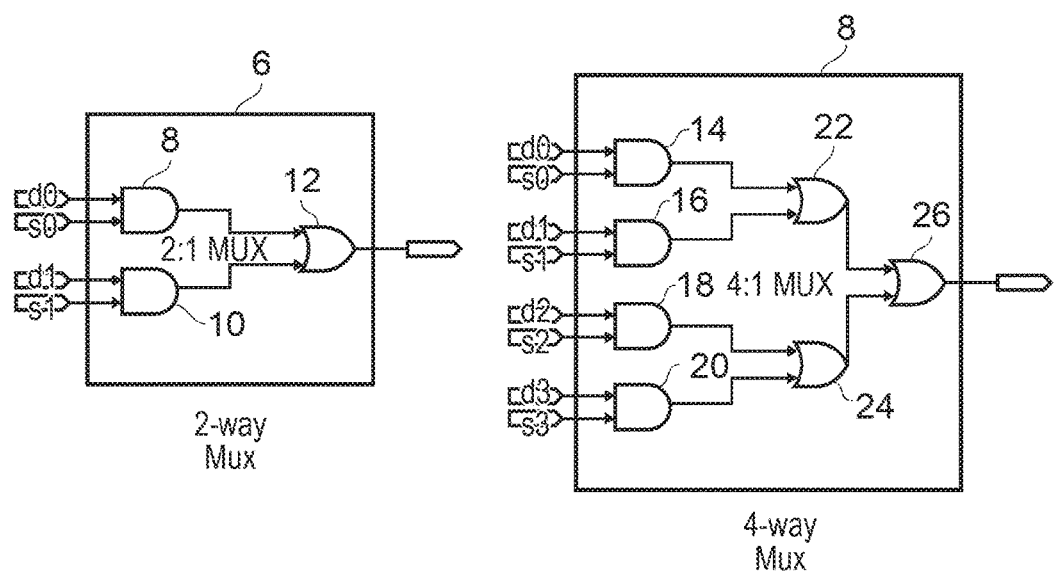

In other examples the N inputs are distributed across arbiter devices providing more than N device inputs, any arbiter device inputs not connected to one of the N inputs being connected to a dummy input. FIG. 2 schematically illustrates example embodiments of a two-way multiplexer 6 and a four-way multiplexer 8. As can be seen, the two-way multiplexer 6 comprises a first level of AND gates 8, 10 followed by a second level of an OR gate 12. Accordingly, the logical depth of the two-way multiplexer 6 is one AND gate 8, 10 and one OR gate 12.

The four-way multiplexer 8 comprises a first level of AND gates 14, 16, 18, 20 followed by two levels of OR gates 22, 24, 26. The logical depth of the four-way multiplexer is one AND gate 14, 16, 18, 20 and two OR gates 22, 24, 26. It will be appreciated that as the radix of the multiplexer successively doubles beyond the four-way multiplexer 8, the number of levels of OR gates 22, 24, 26 increases by one each time, but only a single level of AND gates 14, 16, 18, 20 remains required. Thus, it is more efficient (quicker) in terms of operating speed to utilise fewer higher radix multiplexers rather than a greater number of levels of lower radix multiplexers connected in series.

Figure 3:
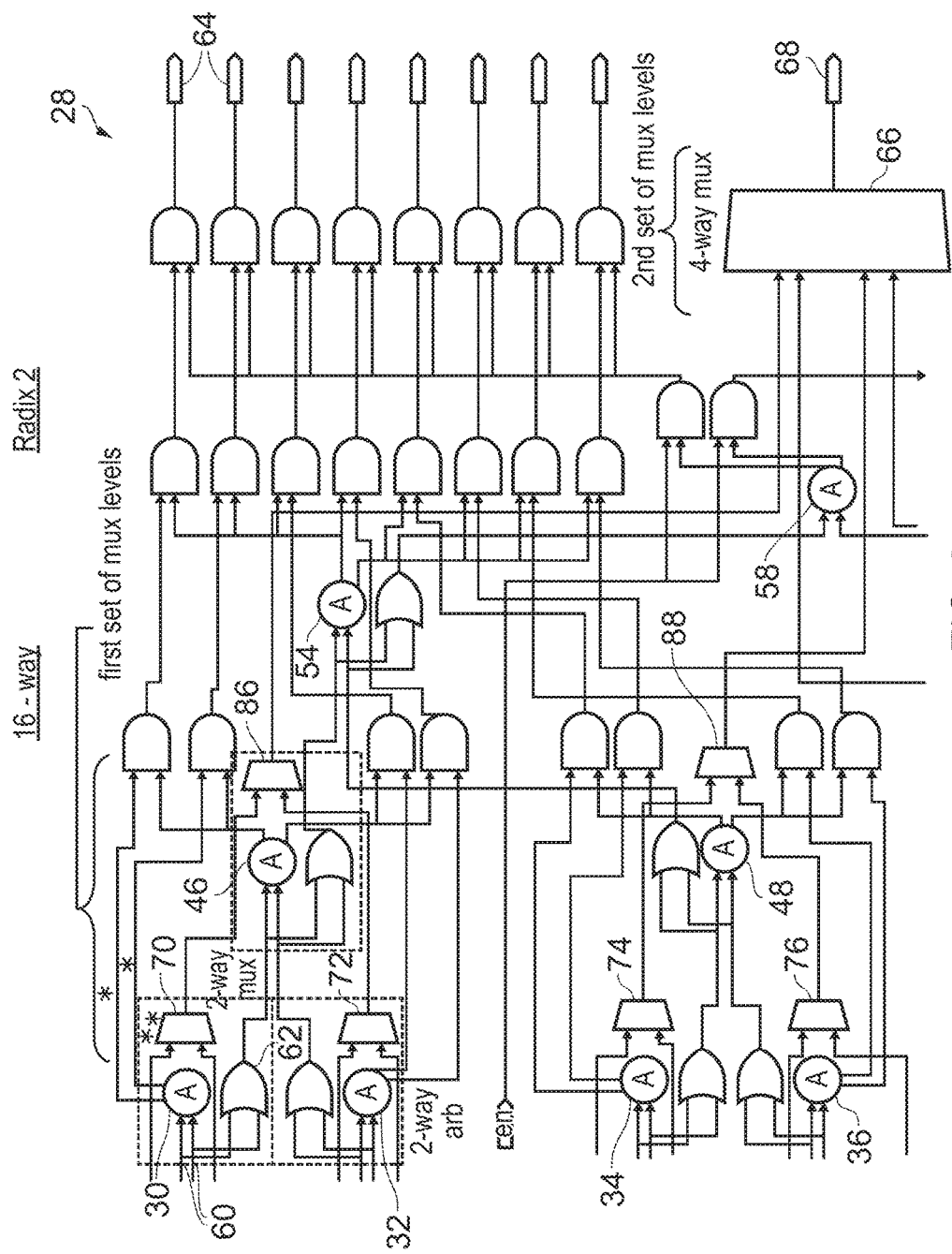
Figure 3:
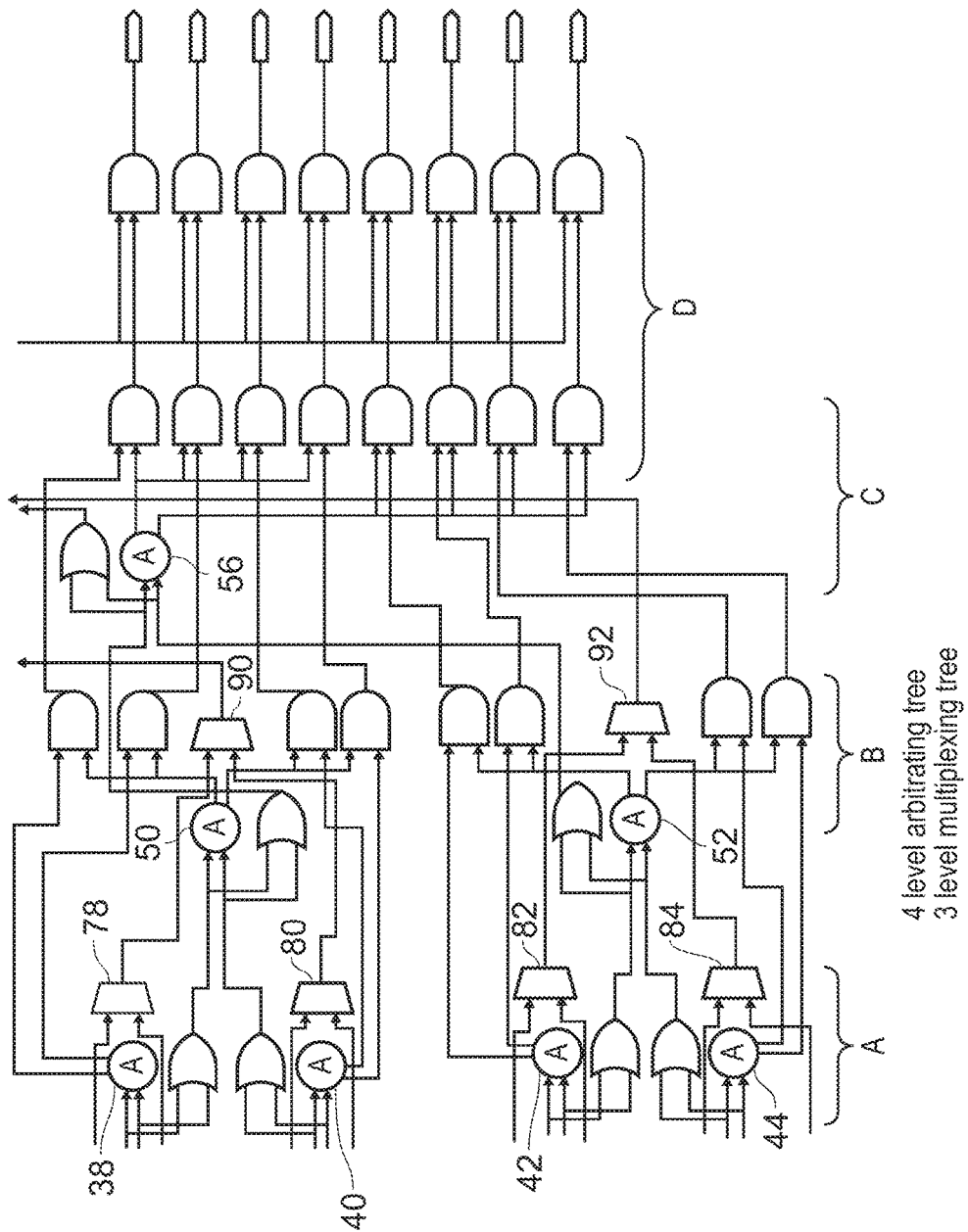

FIG. 3 schematically illustrates a first example embodiment of arbitrating and multiplexing circuitry 28. This arbitrating and multiplexing circuitry 28 includes an arbitrating tree circuitry including the arbiters 30, 32, 34, 36, 38, 40, 42, 44, 46, 48, 50, 52, 54, 56 and 58. Each of these is a radix two arbiter. The arbiters 30 to 58 are arranged as a four level arbitrating tree circuitry. Each level of the arbiters receives its input from the ready signals 60 passed via a sequence of OR gates 62. Accordingly, the arbitration at any given level does not need to wait until the arbitration at a preceding level has completed, rather it need only wait until the ready signals 60 have propagated in modified form to that arbitration level via the intervening OR gates 62. The full arbitration tree circuitry comprises sequentially levels A, B, C and D as marked. The result of the final arbitration when completed generates an arbitration result as a one-hot signal upon the outputs 64.

The outputs from the arbiters 54, 56 and 58 are combined via AND gates (not shown) to generate a one-hot final selecting signal supplied to a final multiplexer 66 which serves to output the selected output 68 when the final level of multiplexing has been completed. The final multiplexer 66 does not perform its selection until after the arbitration has been completed, and it is supplied with the final switching signal which is dependent upon the final level of arbitration performed by arbiter 58.

As will be seen in this example embodiment, in parallel with the arbitration levels A and B are disposed multiplexing levels comprising multiplexers 70, 72, 74, 76, 78, 80, 82, 84, 86, 88, 90 and 92. Each of these multiplexers 70 to 92 comprises a two-way multiplexer, i.e. has the same radix as the associated arbiter 30 to 52 which is illustrated proximal to it and which generates the corresponding intermediate switching signal for switching its associated multiplexer 70 to 92.

In the example illustrated, the arbitrating tree circuitry has four arbitrating levels and accordingly X=4. The multiplexing tree circuitry has three multiplexing levels and accordingly Y=3. The multiplexing tree circuitry is split into a first set of multiplexing levels comprising the multiplexers 70 to 92 (i.e. two levels) and a second set of multiplexing levels comprising the final multiplexer 66 (namely one level of multiplexing). The first set of multiplexing levels, including multiplexers 70 to 92, operates and performs its partial selection in parallel with the operation of the four levels of the arbitrating tree circuitry. The multiplexing levels are slower (logically deeper) than the arbitrating levels and accordingly the output of the first set of multiplexing levels is timed to be available at approximately the same time as the result of the arbitration is completed. The result of the arbitration can then be used to provide the final switching signal to the final multiplexer 66 (second set of multiplexing levels). The second set of multiplexing levels completes the selection and generates the output 68. This final selection follows completion of and is dependent upon the arbitration which is completed in advance of the selection performed by the second set of multiplexing levels.

Figure 1:
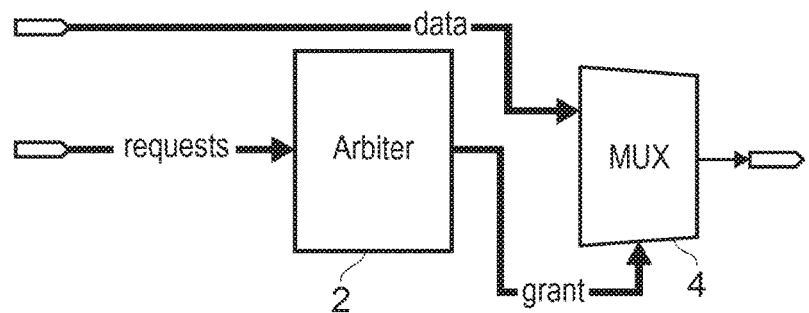

The balancing of the speed of operation of the first set of multiplexing levels with the speed of operation of the arbitrating tree circuitry may, in some example embodiments, be undertaken so that a maximum number of multiplexing levels (may be hidden in respect of timing) operate in parallel with the arbitration without the arbitration finishing significantly before the partial selection. Thus, when the arbitration finishes and the arbitration result is available in order to perform the final selection, the partial multiplexing will already have been performed (or will nearly have finished) and the final multiplexer 66 may be switched. As the final multiplexer 66 is able to be narrower due to the partial multiplexing which has already taken place, the logical depth of the final multiplexer 66 is less than if the full level of multiplexing was required to be performed subsequent to the arbitration being completed (e.g. as in FIG. 1). Accordingly, the overall time taken to complete both the arbitration and the selection may be reduced. A good balance between the speed of operation of the first set of multiplexing levels and the arbitration tree circuitry has been found to be when the number of levels within the first set of multiplexing levels is half that of the number of levels in the arbitrating tree circuitry e.g. the number of levels in the first set is the smallest integer greater than or equal to half the number of levels in the arbitrating tree circuitry.

While the example of FIG. 3 uses radix two arbiters and multiplexers, in some other embodiments, radix four multiplexers and arbiters may be used as giving a better balance between logical depth and ready implementation.

The arbitration which is performed by the arbiters 30 to 58 can be performed in accordance with a variety of different arbitration algorithms. For example, these algorithms may include a pseudo least recently used algorithm, a least recently used algorithm, a fair arbitration algorithm and a random algorithm. A weakly fair arbitration algorithm is an example of a fair arbitration algorithm and such a weekly fair arbitration algorithm is described in the above referenced published US patent application US-A-2013/0318270, which is incorporated herein in its entirety by reference (in particular the discussion of the operation and implementation of the weakly fair arbitration algorithm described).

Figure 4:
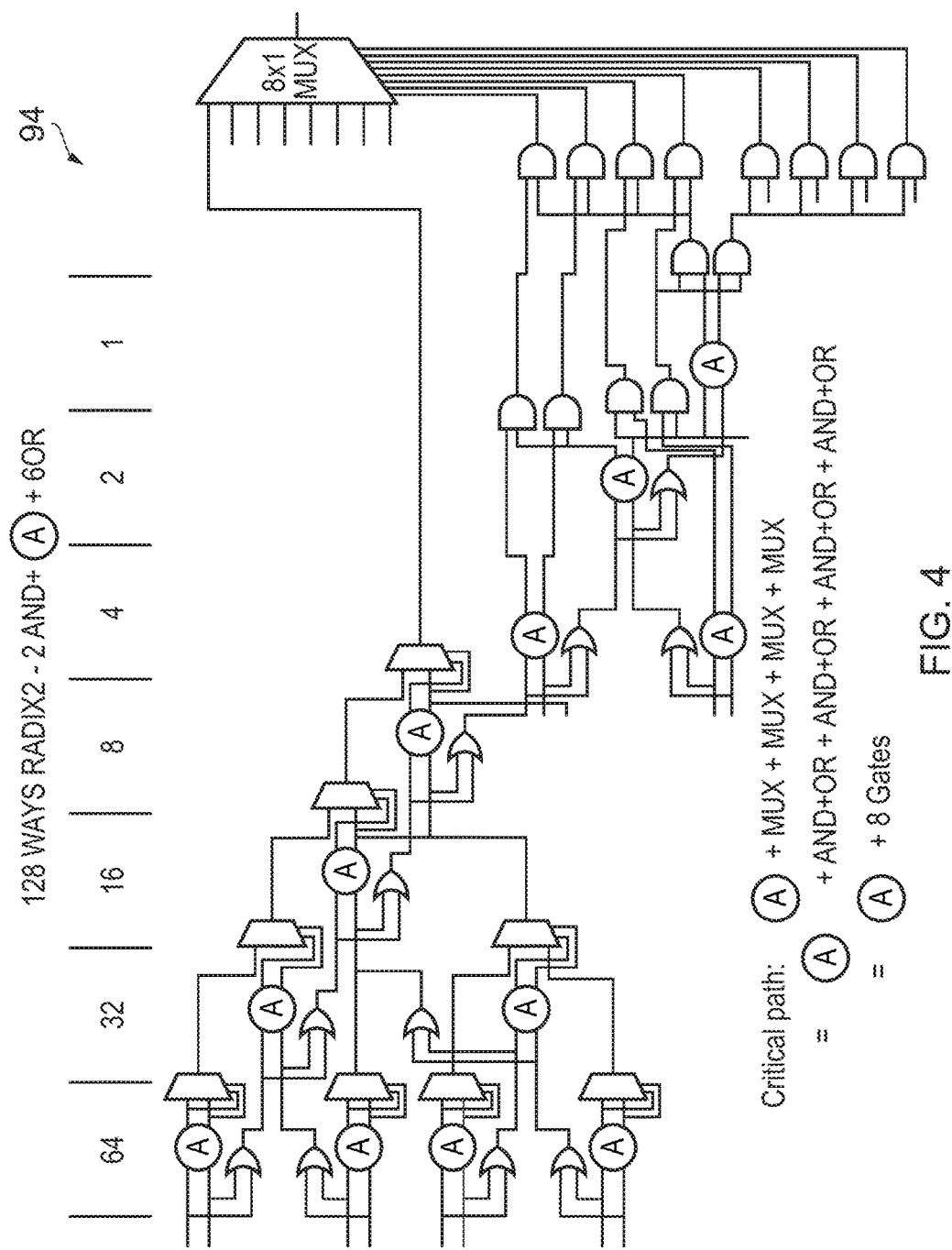

FIG. 4 schematically illustrates a second example embodiment of an arbitrating and multiplexing circuitry 94. In this example, only a portion of the circuitry is illustrated following one example signal path. The arbitrating and multiplexing circuitry 94 in this example receives 128 inputs and uses radix two arbiters and multiplexers at each of the arbitrating levels and multiplexing levels. As illustrated in FIG. 4, the critical path depth through the arbitrating and multiplexing circuitry 94 is equivalent to the time to pass through one arbiter and eight logic gates.

Figure 5:
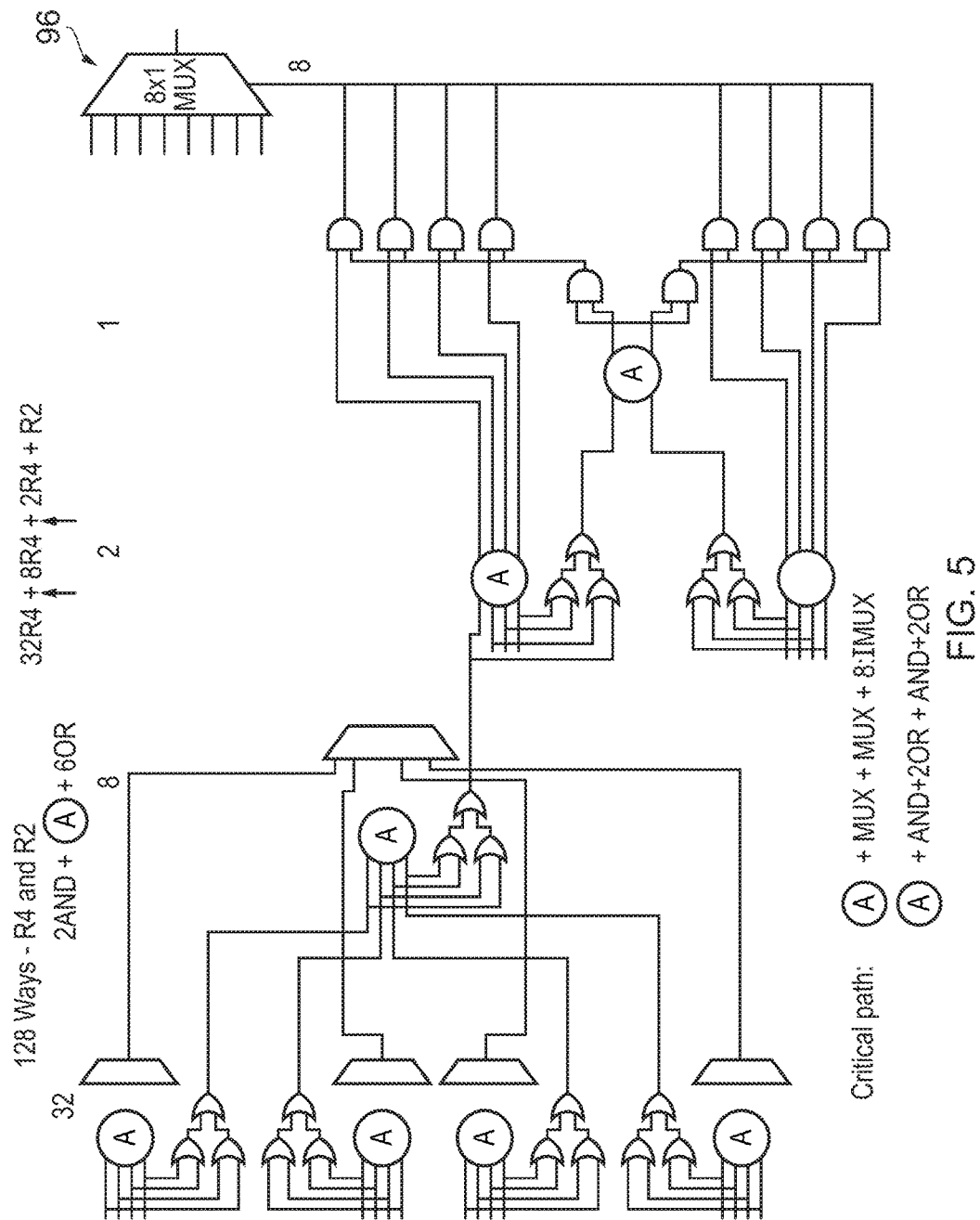

FIG. 5 schematically illustrates a third example embodiment of arbitrating and multiplexing circuitry 96. Again, an example signal path is illustrated rather than the entirety of the arbitrating and multiplexing circuitry 96. In this example there are 128 ways corresponding to the number of inputs between which arbitration and selection is to be performed. All but the final level of arbitration utilises 4-way arbiters. The final level of arbitration uses a 2-way arbiter. The final multiplexer is an 8-way multiplexer.

Figure 6:
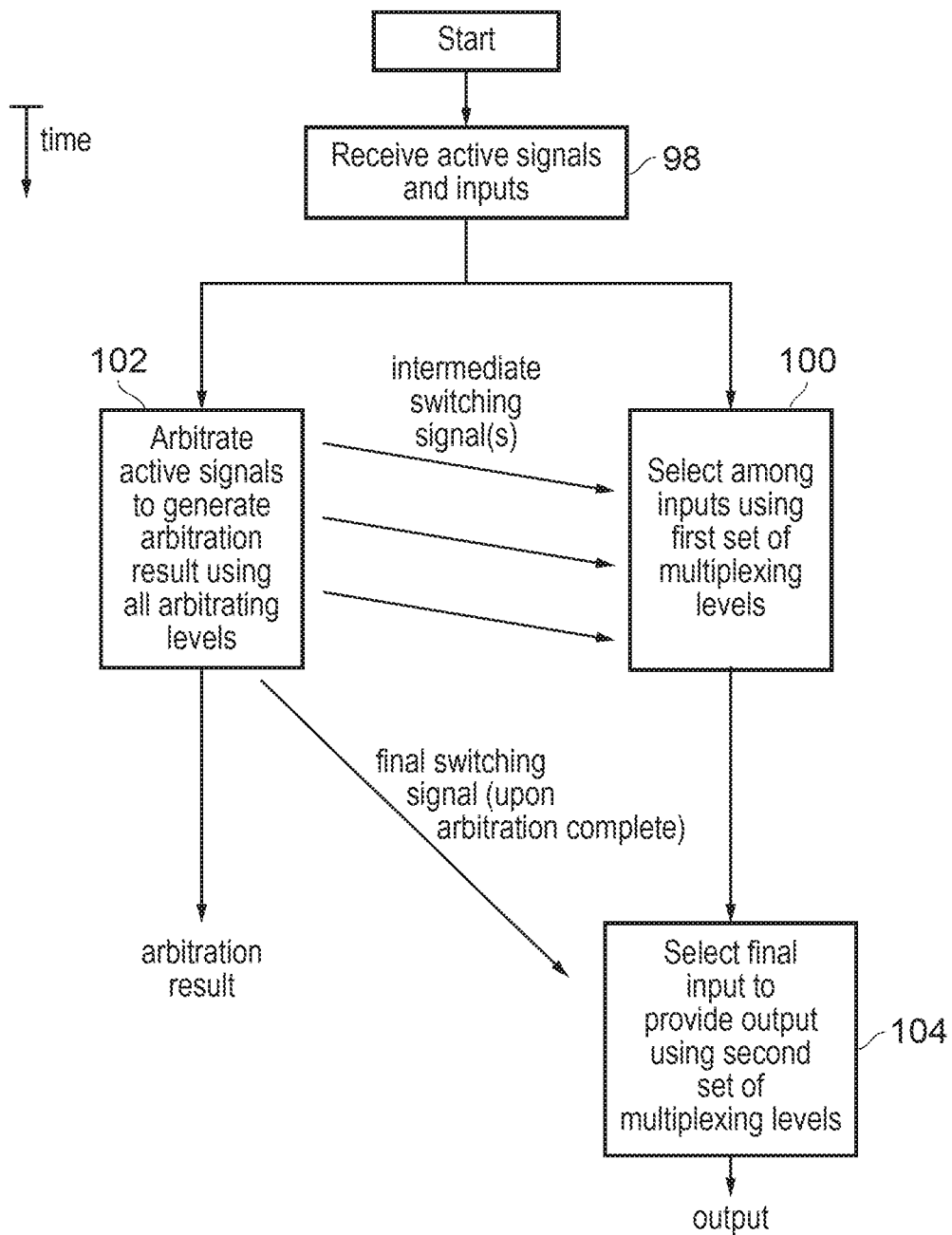
FIG. 6 is a flow diagram schematically illustrating the operation of the embodiments of FIGS. 3, 4 and 5.

FIG. 6 schematically illustrates the operation of the arbitrating and multiplexing circuitry 28, 94, 96 of the embodiments of FIGS. 3, 4 and 5. At step 98 a plurality of active signals and inputs are received between which arbitration and selection is to be performed. At step 100 the first set of multiplexing levels within the multiplexing tree circuitry serves to select amongst the inputs to perform a partial selection. A parallel full arbitration is performed in step 102. These selections as performed by the first set of multiplexing levels are driven (controlled) by intermediate switching signals received from the parallel operation of the arbitrating tree circuitry performed at step 102. These intermediate switching signals, as they become available, serve to switch their associated multiplexers.

When the arbitration tree circuitry has completed its operation and the arbitration is complete, then a final switching signal is supplied to the second set of multiplexing levels which performs its final selection at step 104 to provide the output and complete the selection operation. The result of the full arbitration finished at the end of step 102 also results in the generation of an arbitration result in the form of a one-hot signal indicating which of the inputs was selected by the arbitration.

Figure 7:
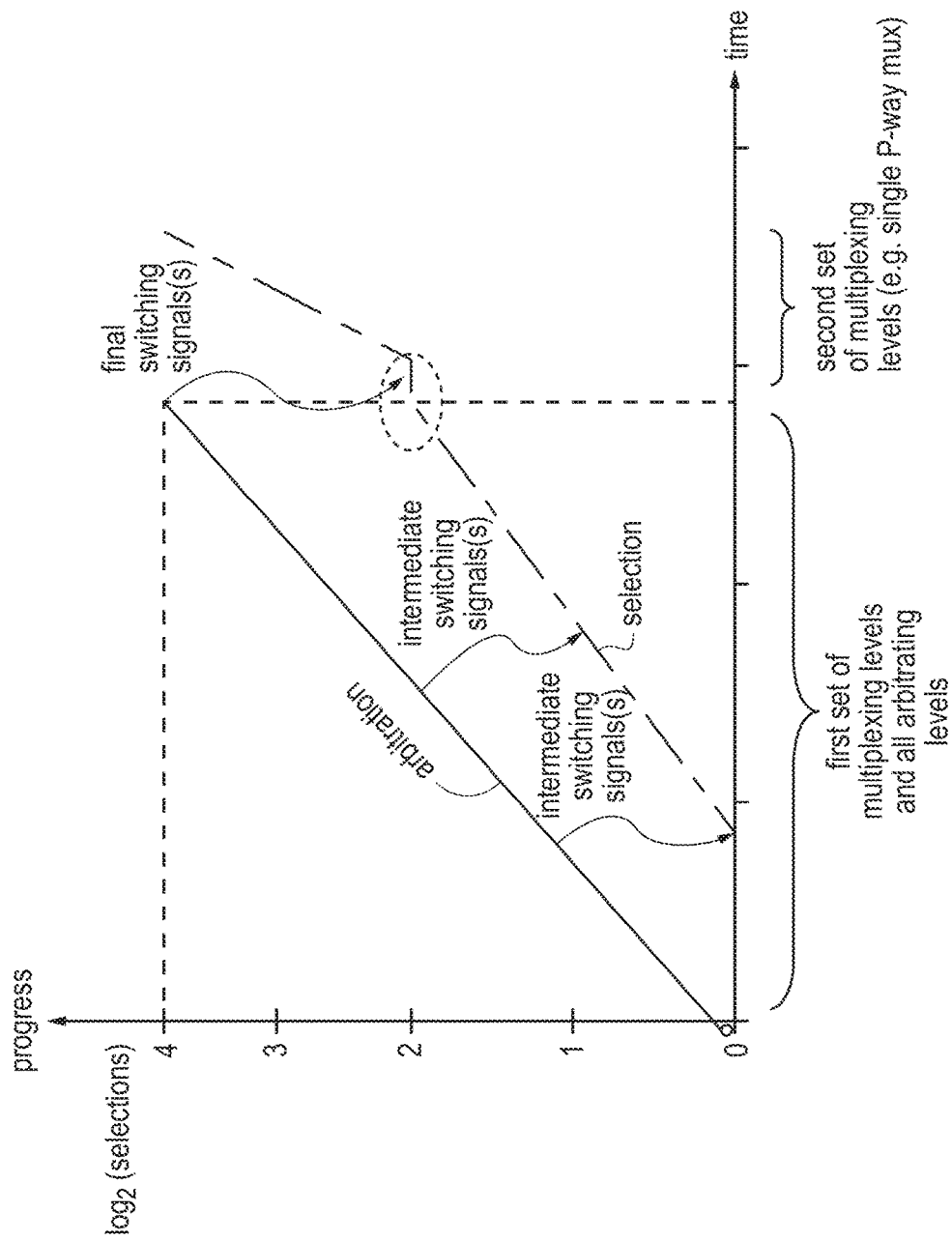
FIG. 7 is a diagram schematically illustrating the parallel operation of the multiplexing tree and the arbitrating tree followed by a final multiplexing operation.

FIG. 7 is a diagram schematically illustrating the progress of the arbitration and the selection performed by the example embodiment of FIG. 3. The arbitration proceeds until four levels of selection have been performed corresponding to the four arbitrating levels. After the first of these levels of arbitration has been completed, then the selection by the multiplexing levels of the first set of multiplexing levels will start, as driven by the now available intermediate switching signals. The speed of operation of the first set of multiplexing levels and the arbitrating tree circuitry including all levels, is balanced such that these complete the full arbitration and the partial selection at approximately the same time. Thus, when the final switching signal(s) becomes available following completion of the arbitration, and in dependence upon the arbitration, then the final switching signal(s) may be used to control the selection by the second set of multiplexing levels, namely the final multiplexer 66 which performs a radix four selection corresponding to two levels of selection in one go relative to the radix two levels selection performed in parallel with operation of the arbitration tree circuitry by the first set of multiplexing levels.

An aspect of the arbitrating and multiplexing circuitry discussed above is, in some instances, a high degree of so-called fan-out in the circuitry. That is to say, in some parts of the circuitry described above, a single logic gate may need to drive the inputs of several subsequent logic gates. For example, considering the portion D of FIG. 3, the output AND gates are driven by a small number of preceding AND gates such that in some instances eight output gates are driven by a single preceding gate. This fan-out can increase the capacitance to be driven by the preceding gates which in turn can slow down operation of the circuitry. To alleviate this, the preceding gate can be made more powerful but this can require larger areas and/or lead to increased power consumption in an integrated circuit implementation. Another consideration is that there is a practical limit to the maximum drive strength of logic cells. Once this limit is reached, the frequency of the circuit cannot be further improved by using bigger transistors.

FIG. 8 schematically illustrates an arbitration circuit. As well as being considered in its own right, this can also form technical background for discussion of an arbitration and multiplexing circuitry to be discussed below.

In FIG. 8, the left hand side of the drawing shows request inputs R0 . . . R15 and at the right hand side, grant outputs G0 . . . G15. At any arbitration cycle, zero or more of the request inputs may be asserted. If no request inputs are asserted and so no requests are present, no grant outputs will be asserted by the arbitration circuitry. If only one request input is asserted, the correspondingly numbered grant output will be asserted by the arbitration circuitry. If two or more request inputs are asserted at a particular arbitration cycle, the in normal operation one of those will be selected by the arbitration circuitry and the corresponding grant output asserted (although it would be possible in some examples that none of them would be selected). So, zero or more requests may be present and either zero or one grants are provided.

An array of arbiter devices 800 is provided. The operation of an individual arbiter device will be discussed below with reference to FIG. 9. The arbiter devices are organised as pairs such as pairs 810, 820, 830 so that a particular pair of arbiter devices receives each of a pair of request inputs and generates arbitration outputs to be discussed further below. So, for example, the pair of arbiter devices 810 each receive the request inputs R0 and R1.

The arbiter devices 800 are denoted by the indications A and A'. This is to indicate a possibility, which might for example be introduced by integrated circuit logic synthesis software, that some instances of logic circuitry may be formed in an integrated circuit implementation differently from other instances, even if their overall function is the same. For example, the integrated circuit logic synthesis software can, for reasons of efficiency or layout or practical operation, arrange that alternate instances of logic such as the arbiter devices 800 are implemented using opposite sense logic, so that logical true may be represented by either high or low voltage. This does not however affect the overall operation as discussed here.

The arbiter devices are also arranged as successive sub-levels, such that in FIG. 8 a first sub-level is represented by a left hand column of arbiter devices, a next sub-level is represented by a next column of arbiter devices (the second column from the left), a third sub-level is represented by a next column and so on. For each sub-level other than a last (right-most as drawn on FIG. 8) sub-level, an arbitration output from each pair of arbiter devices is provided as an input to each pair of arbiter devices in the next sub-level. So, for example, the pair 810 provides its outputs to both pairs in the next sub-level, namely the pairs 830, 840. Similarly, the pair 820 provides its outputs to the pairs 830, 840. This arrangement continues across the diagram of FIG. 8 to the last (right-most) sub-level.

The arrangement of FIG. 8 is therefore equivalent to multiple instances of a tree structure, such that each pair of arbiter devices in the last sub-level receives inputs from two pairs in the penultimate sub-level, which are derived from inputs from four pairs in the second sub-level and/or eight pairs in the first sub-level. Therefore, each pair of arbiter devices in the final sub-level is at the apex or root of a tree structure extending to all of the devices in the input or first sub-level.

The example in FIG. 8 uses a radix of 2 and concerns sixteen inputs or "ways". A different radix can be used, for example, 3, 4 or another number. Also, the number of ways could be, but does not have to be, a power of the radix value. In the example of FIG. 8, the number of ways=radix$^4$. Other examples in which the number of ways is not a power of the radix value will be discussed below.

An example of each individual arbiter device is shown schematically in FIG. 9.

The circuitry of FIG. 9 represents an arbiter device for use when the radix value is 2, having a pair of inputs Ra and Rb.

If either or both of these request inputs Ra, Rb is asserted, then the arbiter device will assert an output R'a. This signifies that if one of the request inputs to the circuitry of FIG. 9 is asserted, the circuitry of FIG. 9 will select that input; if both of the request inputs Ra, Rb are asserted then the circuitry of FIG. 9 will select one of them, which in turn means that the circuitry of FIG. 9 will have an output indicating that a request has been selected and requires processing by a subsequent sub-level of the circuitry of FIG. 8, but if neither Ra nor Rb is asserted then the circuitry of FIG. 9 will not output a selection from amongst them. Therefore, the output value R'a indicates that there is a request being passed onto the next sub-level in the circuitry and is formed as:

R'a=Ra+Rb (where the "+" sign indicates a logical OR operation)

The circuitry of FIG. 9 also generates a grant indication G'a indicating whether a request at the input Ra has been granted. This is based upon the inputs Ra, Rb, a priority value Pa associated with the input Ra and a previous grant value Ga associated with the input Ra.

The previous grant value Ga is received from a preceding stage in the structure of FIG. 8, and in particular a horizontally preceding or aligned stage as drawn in FIG. 8. If a grant indication is not received from that preceding stage, a grant indication is not provided as an output G'a to the next stage. So, the chain of grant indications Ga . . . G'a forms a direct path between a particular request input and the correspondingly numbered grant output.

The priority Pa indicates whether Ra has priority over Rb. An example way in which this can be used is as follows. In a so-called pseudo-least-recently-used arrangement, a register (not shown in FIG. 9) stores the priority value in dependence upon which of Ra and Rb was most recently selected. In the event of a conflict of selection between Ra and Rb, the one which was least recently selected will be selected this time. In FIG. 9, the priority value Pa is combined with Ra by an AND gate so that if Ra is asserted and Pa is also asserted (indicating that Ra has priority) then the output of the AND gate 900 will be asserted.

The output of the AND gate 900 is provided to an OR gate 910, with the other input coming from a gate 920 which provides the function Ra AND NOT Rb. So, this output is asserted if Ra has a request but Rb does not. Therefore, the inputs to the OR gate 910 are, respectively: a logical 1 from the AND gate 900 in the event that Ra is asserted and has priority (irrespective of whether Rb is asserted); and the output of the gate 920 which indicates that Ra was asserted but Rb was not. If either of these is a logical 1 then the OR gate 910 provides a logical 1 output to an AND gate 930 which combines that output with the previously received grant indication Ga to provide the output G'a.

As mentioned above, the arbiter devices are arranged as pairs. A similar device to that shown in FIG. 9 would be provided for the inputs Ra, Rb but with their sense reversed with respect to that of FIG. 9. So, in the complementary arbiter device, Rb would be provided in place of Ra and vice versa. The priority value would be Pb relating to a priority associated with the input Rb and the received and forwarded grant indications would be Gb, G'b. Note that Pb is the inverse of Pa. A single register can be used to store the priority value with an inversion stage being provided to one of the arbiter devices. Alternatively, respective registers or other storage can be used but subject to the constraint that Pb is the inverse of Pa.

It can be seen in FIG. 9 that there is only one gate depth between an input and an output that relies on that input. When the logic is connected in the full circuit of FIG. 8, there is a fan-out of 2 from the R'a output.

FIG. 10 is a schematic diagram concerning the situation where the number of input ways is not a power of radix.

As background, when the number of inputs ways is not a power of the radix, there could be some unbalance in the circuitry layout that could lead to unfairness in the arbitration function. One way to alleviate this is by reversing the node numbering at each level, then connecting the tree as before, as illustrated in FIG. 10. In FIG. 10, nine input requests R0 . . . R8 are processed to generate nine respective grant outputs G0 . . . G8. If these were handled in a radix 2 circuit such as that of FIG. 8, but considering the first nine requests and grants only in that Figure, there could be some potential unfairness in arbitration between the nine request inputs. For example, this could occur because (if only the first nine request inputs of FIG. 8 were handled) the circuitry relating to the request R9 would be acting, in at least some stages of the circuitry, as a pass through for a grant signal corresponding to R9.

Instead, in the example of FIG. 10, a pass-through function is retained, in order to cope with the fact that nine ways is not a power of the radix of two, but this pass-through function is applied in different positions in the circuitry rather than along a path corresponding to one (in this example) request.

In FIG. 10, solid circles (such as a circle 1000) represent arbitrating nodes, and open circles (such as a circle 1010) represent nodes that are pass-through, for example only containing (for example) buffering or invertors. Here, the term "pass-through" indicates that an arbitrating function is not carried out at that node. It can be seen that four stages are provided for 9 request inputs R0 . . . R8 in a radix-2 system, where $2^4$ is the next higher power of radix above the number of inputs.

In order to achieve arbitration between the nine request inputs, each stage can include one or more pass-through functions (open circles). In this example, at least one open circle is provided at each stage, and these are distributed in the example by, in effect, reversing the order in which inputs are handled at each successive stage. To explain this, in the example of FIG. 9 the radix is two and there is an odd number of inputs, so there will be an "extra" input which cannot be grouped into a set of pairs at each stage. Consider the first stage 1020. Here the inputs are arranged in pairs starting at R0, so that the input R8 is the ninth input and is handled (at this first stage) by a pass-through or open circle. However, in the next stage 1030, the pairing is carried out from R8 down to R0, so that the row corresponding to the input R0 is the ninth input and is handled by a pass-through. At the third stage 1040 the order is reversed again so that the row corresponding to R8 is handled by a pass-through. At the fourth stage 1050, a remaining arbitration operation has to be carried out on R0 and R8 and the process is complete.

Another way to construct the network is as follows: At the leaf level (nearest the inputs), the "logical" number of inputs is expanded to be the next largest power of RADIX and the actual inputs distributed across them. For example, in the case that nine requests R0 . . . R8 are to be handled, a 16-input circuit is used (as the next higher power of radix) and the nine requests are allocated to the sixteen inputs so as to distribute the nine requests as evenly as possible. There may be multiple alternative allocations which achieve an equally well distributed system. In one example, the nine requests R0 . . . R8 are allocated as follows:

| Logical input to circuitry | Request input |
|---|---|
| 0 | R0 |
| 1 | tied low - see below |
| 2 | R1 |
| 3 | R2 |
| 4 | tied low - see below |
| 5 | R3 |
| 6 | tied low - see below |
| 7 | R4 |
| 8 | R5 |
| 9 | tied low - see below |
| 10 | R6 |
| 11 | tied low - see below |
| 12 | R7 |
| 13 | R8 |
| 14 | tied low - see below |
| 15 | R9 |

The "logical" inputs that do not correspond to an actual input are tied low or in other words connected to a dummy input. In an actual implementation as an integrated circuit layout, it is likely that an integrated circuit layout tool will detect that these inputs are not achieving a useful function and will, through a known layout optimisation process, remove at least some of the gates corresponding to those inputs during layout implementation.

In some examples, the arrangement of inputs can be carried out as follows. Up to a number (equal to radix) of actual request inputs are grouped together until the number of groups of inputs plus the number not in a group is equal to the next smallest power of radix. So, for example, for a WAYS==10, RADIX==2 arbiter, the grouping of inputs would be:

(((0 1)(2 3))((4 5)(6 -)))(((7 -)(8 -))((9 -)(10 -)))

Here, the notation is such that input pairs of request inputs are in an inner level of parentheses. Each number represents a request input number (so "1" in the above list represents R1, and so on). A hyphen ("-") indicates an input tied low as discussed above. Within a pair of inputs where one input is tied low, it is logically equivalent for that node to be either of the pair. So, for example, (8 -) is equivalent to (- 8) in the above list.

To alleviate issues of delay, for RADIX>2, rather than clustering (in an example of radix three) as:

((0 1 2)(3 - -)(4 - -))((5 - -)(6 - -)(7 - -))((8 - -)(9 - -)(10 - -))

the request inputs are clustered as:

((0 1 -)(2 3 -)(4 - -))((5 - -)(6 - -)(7 - -))((8 - -)(9 - -)(10 - -))

and for WAYS==20:

((0 1 2)(3 4 5)(6 7 -))((8 9 -)(10 11 -)(12 13 -))((14 15 -)(16 17 -)(18 19 -))

Referring now to FIG. 11, a so-called sparse connection arrangement is schematically illustrated. Once again, a radix 2 example is shown, in respect of eight inputs, leading to the generation of eight grant signals in a similar manner to that discussed above with reference to FIG. 8. Individual arbitration circuits A, A' are as discussed above with reference to FIG. 8.

A first stage is similar to that shown in FIG. 8. However, at the outputs of the first stage of arbiters it is noted that for a particular pair (such as a pair 1110, the grant signals G' (discussed above) will be different between the arbiters in the pair, but the request signal R' (discussed above) will be the same as between the outputs of that pair. This is because:

$R'a = Ra + Rb$ and $R'b = Ra + Rb$

It is therefore possible to provide individual grant signals G' from one stage to the next, as indicated by the horizontally drawn connections in FIG. 11 along each row of arbiters. However, the request signals R' can be shared, given that R'a=R'b for any particular pair (such as the pair 1110). So, in respect of the pair 1110 in the first stage 1100, grant signals G' are passed along the horizontally drawn rows. But the request output R' from just one arbiter of the pair (in this example, the arbiter 1120) is passed as an input to both arbiters in the next successive pairs 1130, 1140 fed by that pair 1110.

In this way, by noting the equivalence of R'a and R'b, the number and/or complexity of signal connections within the array of arbiters can be reduced.

FIG. 12 schematically illustrates an example arbitration and multiplexing circuit using these techniques.

Sixteen data inputs D0 . . . D15 are provided, each with an associated request signal R0 . . . R15. An arbitration function serves to select zero or one of the requests R0 . . . R15 as discussed above, and a multiplexing function to be discussed below serves to output the data D0 . . . D15 corresponding to the selected request at an output 1200.

In this example, the radix of the arbitration circuits is 2 but the radix of each stage of the multiplexing function is 4. There are therefore only two stages 1210, 1220 of multiplexing to achieve a 16-way multiplexing operation. The first stage comprises four 4-way multiplexers (such as a multiplexer 1230), each of which selects one data input from a respective set of four data inputs (D0 . . . D3), (D4 . . . D7), (D8 . . . D11), (D12 . . . D15) and passes its respective output as an input to the final stage multiplexer 1240.

The multiplexers of the first multiplexing stage 1230 are each controlled by an output of a set of arbiters dealing with the respective group of requests, so that for example the multiplexer 1230 is controlled by a set of arbiters which arbitrate between R0 . . . R3.

In this way, each of the four multiplexers of the first stage selects zero or one of its respective four inputs.

The R' signal from any one of the arbiters in a group controlling a first stage multiplexer (such as the R' signal 1255 from an arbiter 1250 in the group handling R0 . . . R3) indicates that a request is present for any one or more of the four respective inputs R0 . . . R3. For the purposes of the further arbitration relating to the second stage multiplexer 1240, it does not matter which of R0 . . . R3 has been granted, because the corresponding input (such as the input 1260) to the multiplexer 1240 will carry that signal from amongst D0 . . . D3. Therefore only the four R' signals, one from each arbitration corresponding to a first stage multiplexer, need to be arbitrated in order to generate a control signal 1270 to control which of the four inputs to the multiplexer 1240 is provided as the output 1200. Having said this, although only four R' signals are required logically, in a practical implementation more of the signals R' can be used in order to reduce fan-out to the select input of multiplexors, noting that the data D being multiplexed may be multi-bit requiring multiple multiplexors.

Comparing the example of FIG. 12 with other example embodiments, FIG. 12 illustrates an example arbitrating and multiplexing circuitry for performing an arbitration between a plurality of inputs D0 . . . D15 and a selection of at least one of the plurality of inputs to provide an output 1200. Arbitrating tree circuitry is provided having X arbitrating levels, where X is an integer greater than one. For example, the arbitration controlling the first stage of multiplexing 1210 can be considered as a first arbitrating level, and the subsequent arbitration controlling the second stage of multiplexing 1220 can be considered as a second arbitrating level (which may comprise a single level as shown, for example). Similarly the multiplexing stages 1210, 1220 can be considered as examples of multiplexing tree circuitry having Y multiplexing levels, where Y is an integer greater than one. In the example, the multiplexing levels comprise a first set 1210 of the multiplexing levels upstream of a second set 1220 of the multiplexing levels. In the example the first set of the multiplexing levels 1210 is configured to operate in parallel with at least some of the arbitrating levels, whereby the first set of multiplexing levels is configured to perform a partial selection (for example, the outputs 1260) in parallel with the arbitration performed by the arbitrating levels; and the second set 1220 of the multiplexing levels is configured to operate in series with the arbitrating levels, whereby the second set of multiplexing levels completes the selection to provide the output following completion of and in dependence upon the arbitration.

In the example of FIG. 12 the single multiplexing level 1220 comprises a final multiplexer switched by a final switching signal 1270 generated upon said completion of said arbitration.

In the example of FIG. 12 the final multiplexer is a P-way multiplexer (for example, P=4) and each level within said first set of multiplexing levels comprises a plurality of Q-way multiplexers (for example, Q=4). Each of the plurality of Q-way multiplexers is switched by a respective intermediate switching signal generated prior to said completion of said arbitration.

For example, each level within said X arbitrating levels comprises a plurality of Q-way arbiters, such as a 4-way arbiter formed, as illustrated, by an array of 2-way arbiters. Therefore, each of said Q-way arbiters comprises an array of interconnected arbiter devices, the array of arbiter devices operating with respect to a respective set of Q inputs. The array of arbiter devices in FIG. 12 comprises M (for example, 2) sub-levels, at least a first sub-level having T arbiter devices (for example, T=2, considering an arbiter device in this context as a pair of interconnected devices as drawn (such as the pairs 810, 820, 830, 840 of FIG. 8), acting on the same input requests) each operating with respect to U inputs (for example, U=2), where $Q=U^M$ and Q=TU. For example, each sub-level may have T arbiter devices.

For each sub-level other than a first sub-level, each arbiter device (such as the devices 830, 840) in a sub-level is configured in FIGS. 8 and 12 to receive as input requests signals indicating an arbitration outcome for two or more arbiter devices (each of 810, 820) in a preceding sub-level, and to arbitrate between those input requests. Note that each permutation of connections could be provided as illustrated schematically in FIG. 8, or sparser connections could be provided as indicated in FIG. 11, within this overall definition.

As discussed with reference to FIG. 9 each arbiter device may be configured to detect whether to select a given input in response to a request for selection of that input and requests for selection of the others of the inputs handled by that arbiter device. For example, each arbiter device is responsive to state data (such as the priority input Pa, Pb) indicating a more-recently granted input, to select another of the inputs handled by that arbiter device in response to a conflict of requests with the more recently granted input. FIG. 13, to be discussed below, schematically illustrates logic to update the state data for use by an arbiter device in response to a request on one of the inputs handled by that arbiter device being granted by the arbitrating and multiplexing circuitry.

Each arbiter device (such as 810 . . . 840) may comprise two or more instances of arbitration logic 800, each instance being configured to detect whether a request at a corresponding input should be granted. A final arbitration level is drawn to the right side of FIG. 12 having an array of interconnected arbiter devices configured to arbitrate between arbitration outputs of the plurality of Q-way arbiters.

In some examples such as those discussed with reference to FIG. 10, the total number of inputs N is not equal to an integer power of U. In some examples, as illustrated in FIG. 10, the N inputs may be distributed across arbiter devices and pass-through devices 1010 so that for each sub-level, at least one pass-through device is provided. In the example of FIG. 10, a grouping of inputs amongst the arbiter devices and pass-through devices differs between at least two of the sub-levels.

In other examples such as those discussed above, the N inputs are distributed across arbiter devices providing more than N device inputs, any arbiter device inputs not connected to one of the N inputs being connected to a dummy input.

FIG. 12 also illustrates an example of an apparatus comprising: arbitration circuitry having at least one arbitration level (two levels are provided in FIG. 12); multiplexing circuitry having a plurality of multiplexing levels 1210, 1220; wherein: a first one 1210 of said multiplexing levels is upstream of a second one 1220 of said multiplexing levels; the first multiplexing level is configured to operate in parallel with the at least one arbitration level (the second stage of arbitration can take place at the same time, or in an overlapping time period, as the multiplexing 1210); and the second multiplexing level is configured to operate in series with the at least one arbitration level (the final stage 1220 has to wait for the outcome of the arbitration)

At least FIGS. 8, 11 and 12 also provide an example of arbitrating circuitry for performing an arbitration between a plurality of inputs and a selection of at least one of said plurality of inputs, said arbitrating circuitry comprising: an array of interconnected arbiter devices, the array of arbiter devices operating with respect to a set of Q inputs; in which the array of arbiter devices comprises M sub-levels, at least a first sub-level having T arbiter devices each operating with respect to U inputs, where $Q=U^M$ and $Q=TU$, in which, for each sub-level other than a first sub-level, each arbiter device in a sub-level is configured to receive as input requests signals indicating an arbitration outcome for two or more arbiter devices in a preceding sub-level, and to arbitrate between those input requests. For example each sub-level may have T arbiter devices.

FIG. 13 schematically illustrates an example eight input arbiter (which could be associated with multiplexing circuitry as discussed above) handling request inputs R0 . . . R7 and generating grants G0 . . . G7. The arbitration circuitry is similar in operation to that of FIG. 8.

Additional circuitry is provided to maintain and update priority information P, discussed with respect to FIG. 9 above. This indicates a more-recently granted request input at each stage so that in an example pseudo-least-recently-used arbitration scheme the less-recently granted input can be preferred in an instance of a conflict of requests.

For a first arbitration level 1300, a set of four registers (flip-flops) 1302, 1304, 1306, 1308 holds the respective priority data as a single bit indication provided at an output 1303 and its inverse 1305 in each case. An input to the register is the grant output from one of the arbiters of the pair provided with priority information by that register. The register is clocked by a signal 1330 generated by an OR-gate 1332, 1334, 1336, 1338 which adds the grant outputs for the pair of request inputs handled by that pair of arbiters. So, for example, if either of G0 or G1 is asserted (and only one of them will be at any cycle, rather than both, because of the nature of the arbitration process) then the register 1302 is clocked, and its input is transferred to its output. Note that only one of the two grant outputs G' from the corresponding pair of arbiters would have been set, so the input to the register (now transferred to its output) indicates which of the two arbiters was granted in that cycle. The register then holds this value and provides it, and its inverse, to the arbiters as priority information for the next arbitration cycle.

A similar arrangement is provided for the second arbitration level 1310. Here, further OR-gates 1340, 1342 add together pairs of outputs from the OR-gates 1332, 1334, and the OR-gates 1336, 1338 to generate signals 1344 to control registers 1346, 1348. These take as inputs the grant signal from selected ones of the second state 1310 arbiters. A grant signal 1350 indicates whether a pair of arbiters 1352 was successful in preference to a pair of arbiters 1354, and the output of the register 1346 (and its inverse) are provided to the pairs 1350, 1352 as priority inputs for the next arbitration cycle.

For the last stage 1320 as drawn, a register 1360 provides a priority value and its inverse to respective groups of four arbiters. The register 1360 is clocked by the output R' from one of the arbiters, indicating whether the corresponding group of four arbiters included the successful grant.

The arbitrating and multiplexing circuitry described above may, for example, be used as part of a network-on-chip integrated circuit or within interconnect circuitry of a system-on-chip integrated circuit.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:

1. Arbitrating and multiplexing circuitry for performing an arbitration between a plurality of inputs and a selection of at least one of said plurality of inputs to provide an output, said arbitrating and multiplexing circuitry comprising:
   arbitrating tree circuitry having X arbitrating levels, where X is an integer greater than one; and
   multiplexing tree circuitry having Y multiplexing levels, where Y is an integer greater than one; wherein
   (i) said Y multiplexing levels comprise a first set of said multiplexing levels upstream of a second set of said multiplexing levels;
   (ii) said first set of said multiplexing levels is configured to operate in parallel with at least some of said X arbitrating levels, whereby said first set of multiplexing levels is configured to perform a partial selection in parallel with said arbitration performed by said X arbitrating levels;
   (iii) said second set of said multiplexing levels is configured to operate in series with said X arbitrating levels, whereby said second set of multiplexing levels completes said selection to provide said output following completion of and in dependence upon said arbitration;

(iv) each level within said X arbitrating levels comprises a plurality of Q-way arbiters; and
(v) each of said Q-way arbiters comprises an array of interconnected arbiter devices, the array of arbiter devices operating with respect to a respective set of Q inputs.

2. Arbitrating and multiplexing circuitry as claimed in claim 1, wherein said second set of multiplexing levels comprises a single multiplexing level.

3. Arbitrating and multiplexing circuitry as claimed in claim 2, wherein said single multiplexing level comprises a final multiplexer switched by a final switching signal generated upon said completion of said arbitration.

4. Arbitrating and multiplexing circuitry as claimed in claim 3, wherein said final multiplexer is a P-way multiplexer.

5. Arbitrating and multiplexing circuitry as claimed in claim 1, wherein each level within said first set of multiplexing levels comprises a plurality of Q-way multiplexers.

6. Arbitrating and multiplexing circuitry as claimed in claim 5, wherein each of said plurality of Q-way multiplexers is switched by a respective intermediate switching signal generated prior to said completion of said arbitration.

7. Arbitrating and multiplexing circuitry as claimed in claim 1, in which the array of arbiter devices comprises M sub-levels, at least a first sub-level having T arbiter devices each operating with respect to U inputs, where $Q=U^M$ and $Q=TU$.

8. Arbitrating and multiplexing circuitry as claimed in claim 7, in which each sub-level has T arbiter devices.

9. Arbitrating and multiplexing circuitry as claimed in claim 7, in which, for each sub-level other than a first sub-level, each arbiter device in a sub-level is configured to receive as input requests signals indicating an arbitration outcome for two or more arbiter devices in a preceding sub-level, and to arbitrate between those input requests.

10. Arbitrating and multiplexing circuitry as claimed in claim 1, in which each arbiter device is configured to detect whether to select a given input in response to a request for selection of that input and requests for selection of the others of the inputs handled by that arbiter device.

11. Arbitrating and multiplexing circuitry as claimed in claim 10, in which each arbiter device is responsive to state data indicating a more-recently granted input, to select another of the inputs handled by that arbiter device in response to a conflict of requests with the more recently granted input.

12. Arbitrating and multiplexing circuitry as claimed in claim 11, comprising logic to update the state data for use by an arbiter device in response to a request on one of the inputs handled by that arbiter device being granted by the arbitrating and multiplexing circuitry.

13. Arbitrating and multiplexing circuitry as claimed in claim 1, in which each arbiter device comprises two or more instances of arbitration logic, each instance being configured to detect whether a request at a corresponding input should be granted.

14. Arbitrating and multiplexing circuitry as claimed in claim 8, comprising a final arbitration level having an array of interconnected arbiter devices configured to arbitrate between arbitration outputs of the plurality of Q-way arbiters.

15. Arbitrating and multiplexing circuitry as claimed in claim 7, in which the total number of inputs N is not equal to an integer power of U.

16. Arbitrating and multiplexing circuitry according to claim 15, in which the N inputs are distributed across arbiter devices and pass-through devices so that for each sub-level, at least one pass-through device is provided.

17. Arbitrating and multiplexing circuitry according to claim 16, in which a grouping of inputs amongst the arbiter devices and pass-through devices differs between at least two of the sub-levels.

18. Arbitrating and multiplexing circuitry according to claim 15, in which the N inputs are distributed across arbiter devices providing more than N device inputs, any arbiter device inputs not connected to one of the N inputs being connected to a dummy input.

19. A method of arbitrating and multiplexing to perform an arbitration between a plurality of inputs and a selection of at least one of said plurality of inputs to provide an output, said method comprising the steps of:
performing said arbitration with arbitration tree circuitry, said arbitrating tree circuitry having X arbitrating levels, where X is an integer greater than one; and
performing said selection with multiplexing tree circuitry, said multiplexing tree circuitry having Y multiplexing levels, where Y is an integer greater than one; wherein
(i) said Y multiplexing levels comprise a first set of said multiplexing levels upstream of a second set of said multiplexing levels;
(ii) said first set of said multiplexing levels operates in parallel with at least some of said X arbitrating levels, whereby said first set of multiplexing levels performs a partial selection in parallel with said arbitration performed by said X arbitrating levels; and
(iii) said second set of said multiplexing levels operates in series with said X arbitrating levels, whereby said second set of multiplexing levels completes said selection to provide said output following completion of and in dependence upon said arbitration;
(iv) each level within said X arbitrating levels comprises a plurality of Q-way arbiters; and
(v) each of said Q-way arbiters comprises an array of interconnected arbiter devices, the array of arbiter devices operating with respect to a respective set of Q inputs.

20. An apparatus comprising:
arbitration circuitry having at least one arbitration level;
multiplexing circuitry having a plurality of multiplexing levels operable on a set of input signals; wherein:
a first one of said multiplexing levels is configured to perform a partial selection of the input signals upstream of a second one of said multiplexing levels; and
the at least one arbitration level is configured to operate in parallel with the first multiplexing level to complete a full arbitration and generate a final switching signal at substantially the same time that the partial selection is performed by the first one of said multiplexing levels; and
the second multiplexing level is configured to operate in series with the at least one arbitration level and to perform, in response to the final switching signal, a final selection of one of the input signals based on the partial selection of the input signals.

21. A method comprising:
performing arbitration using at least one arbitration level; and
performing multiplexing of a set of input signals using a plurality of multiplexing levels; wherein a first one of said multiplexing levels is configured to perform a partial selection of the input signals upstream of a second one of said multiplexing levels;

the at least one arbitration level is configured to operate in parallel with the first multiplexing level to complete a full arbitration and generate a final switching signal at substantially the same time that the partial selection is performed by the first one of said multiplexing levels; and the second multiplexing level is configured to operate in series with the arbitration level and to perform, in response to the final switching signal, a final selection of one of the input signals based on the partial selection of the input signals.

* * * * *